United States Patent
Bajko

(10) Patent No.: US 8,259,692 B2
(45) Date of Patent: Sep. 4, 2012

(54) METHOD PROVIDING POSITIONING AND NAVIGATION INSIDE LARGE BUILDINGS

(75) Inventor: Gabor Bajko, Mountain View, CA (US)

(73) Assignee: Nokia Corporation, Espoo (FI)

( * ) Notice: Subject to any disclaimer, the term of this patent is extended or adjusted under 35 U.S.C. 154(b) by 795 days.

(21) Appl. No.: 12/172,153

(22) Filed: Jul. 11, 2008

(65) Prior Publication Data

US 2010/0008337 A1 Jan. 14, 2010

(51) Int. Cl.
*H04W 4/04* (2009.01)
(52) U.S. Cl. ............... 370/338; 455/456.1; 455/457
(58) Field of Classification Search .............. 370/338; 455/456.1, 457
See application file for complete search history.

(56) References Cited

U.S. PATENT DOCUMENTS

| 6,807,478 | B2 | 10/2004 | Giannopoulos et al. |
| 7,130,646 | B2 * | 10/2006 | Wang .................. 455/456.5 |
| 7,228,136 | B2 | 6/2007 | Myllymaki et al. |
| 2007/0001904 | A1 | 1/2007 | Mendelson |
| 2007/0149215 | A1 | 6/2007 | Misikangas |
| 2007/0184845 | A1 | 8/2007 | Troncoso |
| 2008/0133697 | A1 * | 6/2008 | Stewart et al. ............... 709/217 |
| 2008/0161011 | A1 | 7/2008 | Babin et al. |

OTHER PUBLICATIONS

IEEE P802.11u/D3.0, Part 11: Wireless Lan Medium Access Control (MAC) and Physical Layer (PHY) Specifications: Amendment 7: Interworking with External Networks, May 2008, pp. 1-183.*
IEEE P802.11u/D8.0, Jul. 2009, pp. 33, 83 and 84.*
Polk et al., RFC3825-Dynamic Host Configuration Protocol Option for Coordinate-based Location Configuration Information, Jul. 2004, pp. 1-20.*
J. Peterson et al., RFC4119-A Presence-based GEOPRIV Location Object Format, Dec. 2005, pp. 1-23.*
H. Schulzrinne et al., RFC 4776-Dynamic Host Configuration Protocol (DHCPv4 and DHCPv6) Option for Civic Addresses Configuration Information, Nov. 2006, pp. 1-18.*
M. Thomson et al., RFC5139-Revised Civic Location Format for Presence Information Data Format Location Object (PIDF-LO), Feb. 2008, pp. 1-15.*

(Continued)

*Primary Examiner* — Melvin Marcelo
(74) *Attorney, Agent, or Firm* — Ditthavong Mori & Steiner, P.C.

(57) ABSTRACT

Positioning and/or navigation of an electronic device within a building when GPS signals are unavailable is provided. The electronic device scans for available Wireless Local Area Network (WLAN) Access Points (APs) upon, e.g., entering a building. The electronic device detects a signal (e.g., beacon) from at least one available WLAN AP, whereupon the electronic device retrieves the indoor location of the available WLAN AP. The location information can be directly downloaded from the WLAN AP while in state-1 via, e.g., a Native Query Protocol which includes an extension to currently defined Native Query info elements that returns location information. Alternatively, the Media Access Control (MAC) address of the WLAN AP can be read from the beacon signal, which is then used to retrieve the location of the WLAN AP from an associated database. Additionally, various embodiments may be implemented with or via a mapping application or service, where the mapping application is able to display any floor's floor plan of a building and determine/obtain the position of the electronic device inside the building relative to the floor plan.

33 Claims, 6 Drawing Sheets

OTHER PUBLICATIONS

International Search Report for PCT Application No. PCT/FI2009/050486 dated Sep. 30, 2009.

Krempels, Karl-Heinz, et al. "Directory-less Indoor Positioning for WLAN Infrastructures extended," IEEE International Symposium on Consumer Electronics, Vilamoura, Portugal, Apr. 14-16, 2008, IEEE, ISBN, 978-1-4244-2422-1, pp. 1-2.

Wu, Shin-Lin, et al. "Wireless Ad Hoc Networking: Personal-area, Local-area, and the Sensory-Area Networks," Auerbach Publications, Taylor & Francis Group, 2007, ISBN 978-0-8493-9254-2, 640 pages, Chapter 9, pp. 255-276.

Office Action for related Korean Application No. 2011-7003125 date May 31, 2012, pp. 1-14.

* cited by examiner

METHOD PROVIDING POSITIONING AND NAVIGATION INSIDE LARGE BUILDINGS

FIELD OF THE INVENTION

The present invention relates generally to positioning and navigation systems. More particularly, the present invention relates to the use of Wireless Local Area Network Access Point (WLAN AP) locations in conjunction with maps, building floor plans, and specification standards for positioning and navigation purposes inside structures such as large buildings where Global Positioning System (GPS) signals are generally unavailable.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various methods have been developed for determining the location of the mobile terminal. For example, some mobile terminals may include GPS as part of the device. GPS systems/services utilize satellites to triangulate to the location of a GPS-enabled device. Alternatively, other methods utilize a ground based network of antennas or base stations to determine the mobile terminal location. For example, an application program might make a request to a wireless carrier network. The wireless carrier would then use one of several methods to determine a user's location on the wireless network and return the latitude and longitude coordinates to the application program. One method involves identifying the cell or base station closest to the mobile terminal. The antenna in communications with the mobile terminal may then be used to determine the relative direction of the mobile terminal. Using the round trip time, the distance from the base station can be determined providing an location with an accuracy approaching 100 meters. Another method using multiple base stations may be used in some circumstances. The location of the mobile terminal can be determined using typically three base stations capable of communicating with the mobile terminal and triangulating the estimated location of the mobile terminal from each individual base station. More precise location estimates approaching 30 meters can be achieved using this method.

It is currently not possible for an electronic device, such as a mobile device, to position itself and to navigate within large buildings, e.g., malls, large office buildings, public buildings (museums, city halls, conference centers, etc.), covered parking lots, etc. Structures and buildings such as these can be up to 1 mile long, for example, with multiple entrances, multiple floors, multiple sections, wings, and in the case of malls, an abundance of shops.

Certain location and navigation systems utilize signals from at least one WLAN AP when such signals are available. For example, Skyhook (skyhookwireless.com) uses a technology for outdoor positioning and navigation (based on WLAN AP locations). However, such technology operates by mapping a WLAN AP beacon (that is found by driving around and scanning) to geolocation coordinates, where the signal was detected, thus still necessitating GPS signal availability. U.S. Pat. No. 7,228,136 and U.S. Patent Publication No. 2007/0149215 describe using WLAN for location using triangulation of signals on multi channel mobile devices, while U.S. Pat. No. 6,807,478 described in-building navigation using light sources. Additionally, a report entitled "The Integration of Positioning Technologies for Precise Location Identification" by T. Y. Chew, available at http://ro.uow.edu.au/thesesinfo/5/, describes the integration of multiple positioning technologies, e.g., combining GPS and Third Generation (3G) networks.

SUMMARY OF THE INVENTION

Various embodiments allow for positioning and/or navigation of an electronic device within a building when, e.g., GPS signals, are unavailable. The electronic device scans for available WLAN APs upon entering or coming within close proximity to a building or structure. If at least one available WLAN AP exists, the electronic device detects a signal from the at least one available WLAN AP. The detected signal can be a beacon signal, for example, whereupon the electronic device retrieves the location of the at least one available WLAN AP. Retrieving the location of the WLAN AP can include directly downloading the location information from the WLAN AP via a Native Query Protocol which in accordance with various embodiments, includes an extension to currently defined Native Query info elements that returns location information. Alternatively, the electronic device may read the at least one available WLAN AP's Media Access Control (MAC) address from, e.g., the beacon signal, and use that to retrieve the location of the WLAN AP from an associated database, where the location of the WLAN AP is associated with/derived from, e.g., extension elements describing indoor location. Additionally, various embodiments may be implemented with or via a mapping application or service.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

Embodiments of the invention are described by referring to the attached drawings, in which.

DETAILED DESCRIPTION OF THE PREFERRED EMBODIMENTS

Figure 1:
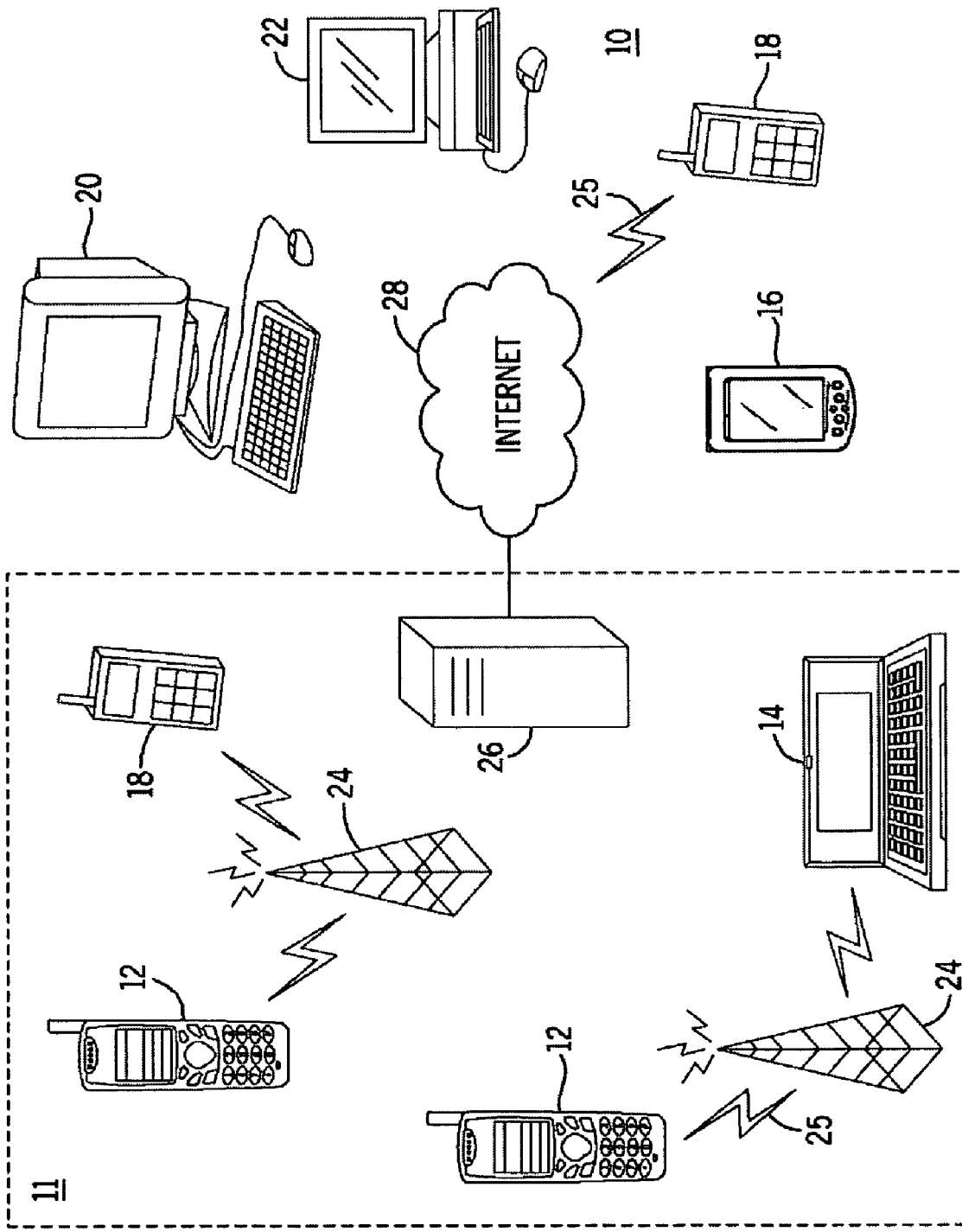
FIG. 1 is an overview diagram of a system within which various embodiments of the present invention may be implemented.

FIG. 1 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, indoor electric transport devices, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28, where the network server 26 may be located in a building or structure (not shown). It should be noted that the network server 26 may not be needed to allow communication between the Internet and an electronic device, and the network server 26 may act as a database for storing WLAN AP location information. The system 10 may include additional communication devices and communication devices of different types.

Communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, Worldwide Interoperability for Microwave Access (WiMax), LTE, etc. A communication device involved in implementing various embodiments of the present invention may communicate using various media including, but not limited to, radio, infrared, laser, cable connection, and the like.

Figure 2:
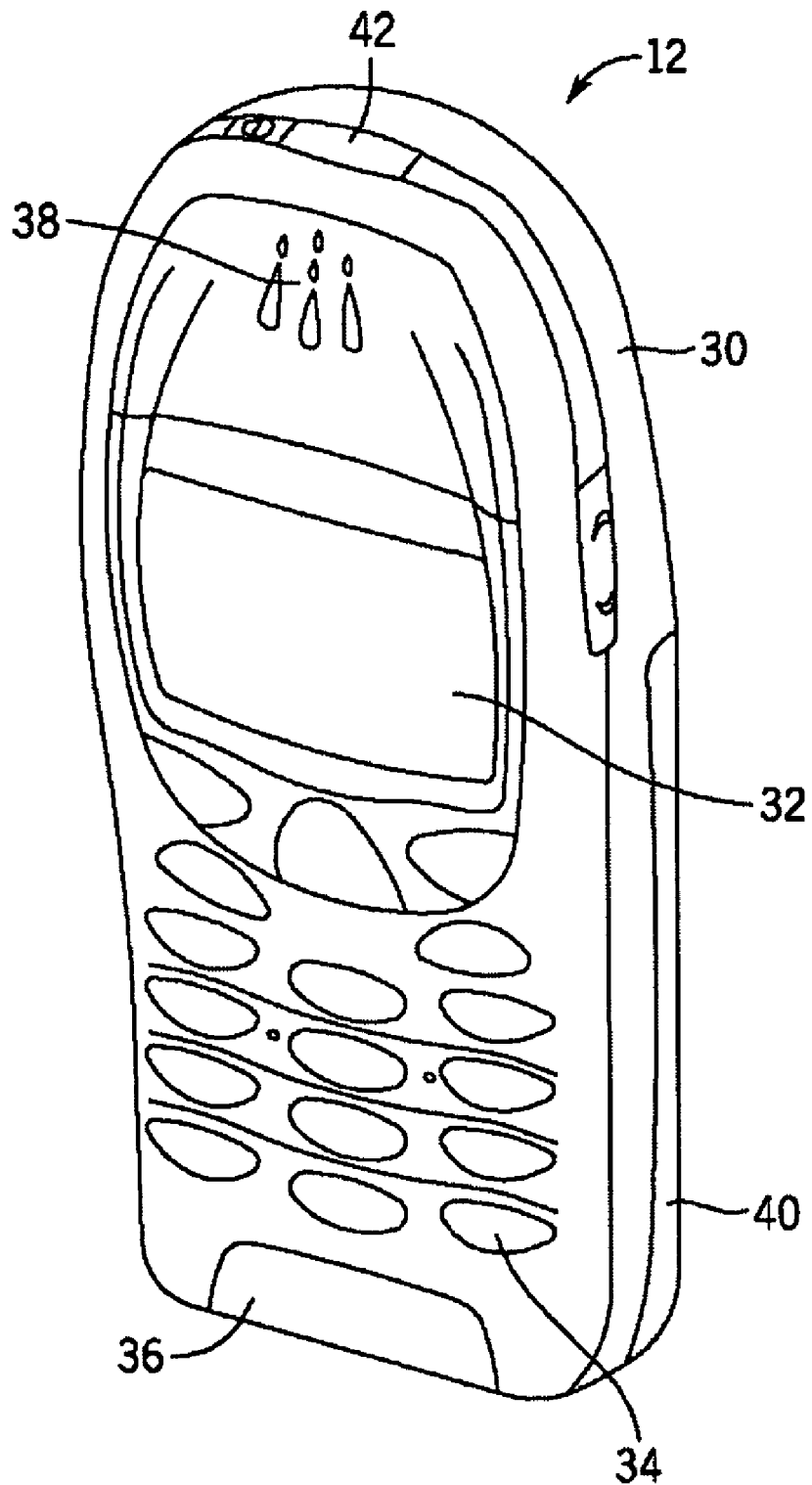
FIG. 2 is a perspective view of an electronic device that can be used in conjunction with the implementation of various embodiments of the present invention.
Figure 3:
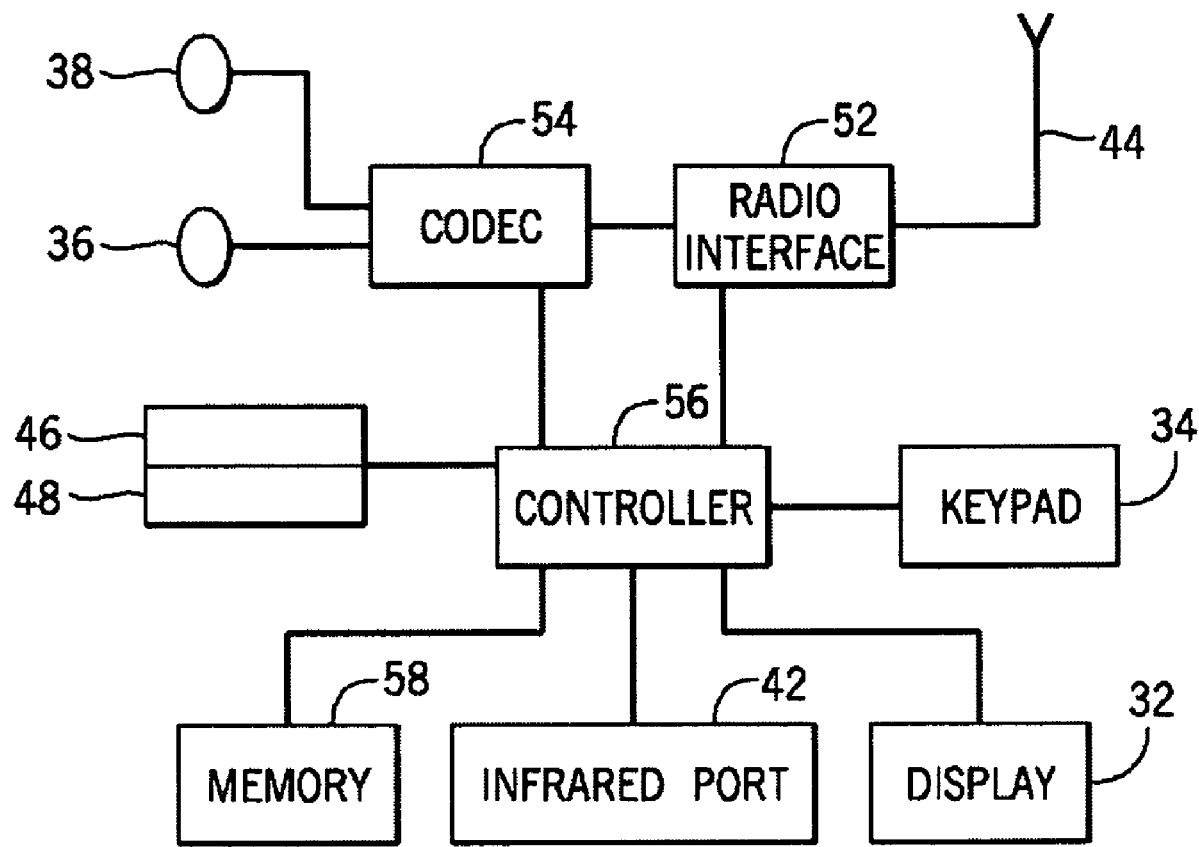
FIG. 3 is a schematic representation of the circuitry which may be included in the electronic device of FIG. 2.

FIGS. 2 and 3 show one representative electronic device 12 within which the present invention may be implemented. It should be understood, however, that the present invention is not intended to be limited to one particular type of device. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

In accordance with various embodiments, an application/system is provided that allows for the positioning a device inside, e.g., a building, whenever a signal from at least one WLAN AP is available. Additionally, various embodiments offer the ability to provide navigation to one or more desired destinations inside the building (e.g., a specific shop in case of malls or a cubicle number in the case of office buildings). In contrast to conventional systems, WLAN location can be utilized in accordance with various embodiments for positioning and/or navigation even when GPS signals are not available by acquiring WLAN location information from APs themselves. Moreover, various embodiments enable positioning relative to/against a building's floor plan, which enables navigation capabilities and provide directory information (e.g., in the case of malls) which enables locating a specific store by its name.

The need/desire to provide wireless Internet connection in, e.g., offices and public buildings is apparent, while nowadays more and more shops have wireless Internet connection inside the store either for conducting more efficient business or for the benefit of employees, for resale of Internet access on the go, etc. Conventionally, access to such wireless Internet connections are often restricted to authorized users only. However, the nature of WLAN technology (where the MAC address of an AP is broadcasted and can be read by any WLAN station scanning for the beacon) enables exploitation of the presence of WLAN signals for use with indoor positioning and navigation systems in accordance with various embodiments.

The Institute of Electrical and Electronic Engineers (IEEE) 802.11v standard Working Group (WG) has defined a method which allows WLAN stations associated with a WLAN AP to download the location of the AP. However, certain issue exist with using this feature in a public building as currently proposed. For example, retrieving the location of the WLAN AP involves an association with the WLAN AP which can be time consuming. Also, as described above, association to WLAN APs may be restricted to authorized users, and thus the location of a WLAN AP is also only available for those authorized users. If the WLAN AP provides free access (e.g., wireless "hotspots" such as Starbucks, airports, etc.), then location can be retrieved for free as well. However and again, free access is not always the case. Furthermore, issues arise with regards to the type of location that can be configured for a WLAN AP inside, e.g., a building There are currently two location formats which are widely supported: civic location (e.g., postal address) and geolocation (e.g., location coordinates, WGS 84). In the case of a building, the civic location usually points to/is representative of the main entrance of the building, although in certain cases, secondary entrances may also have a separate civic address. Current standards for civic address format as presented in RFC3825, RFC4119 and extended by RFC4776 and RFC5139, do not allow for a hierarchical or detailed indoor addressing that would allow for further address-specific locations inside a building. For example, conference centers may have wings or sections as well as multiple floors etc. Large malls may have store numbers or even their own streets and street numbers (which only have local significance within the mall), etc.

Figure 4:
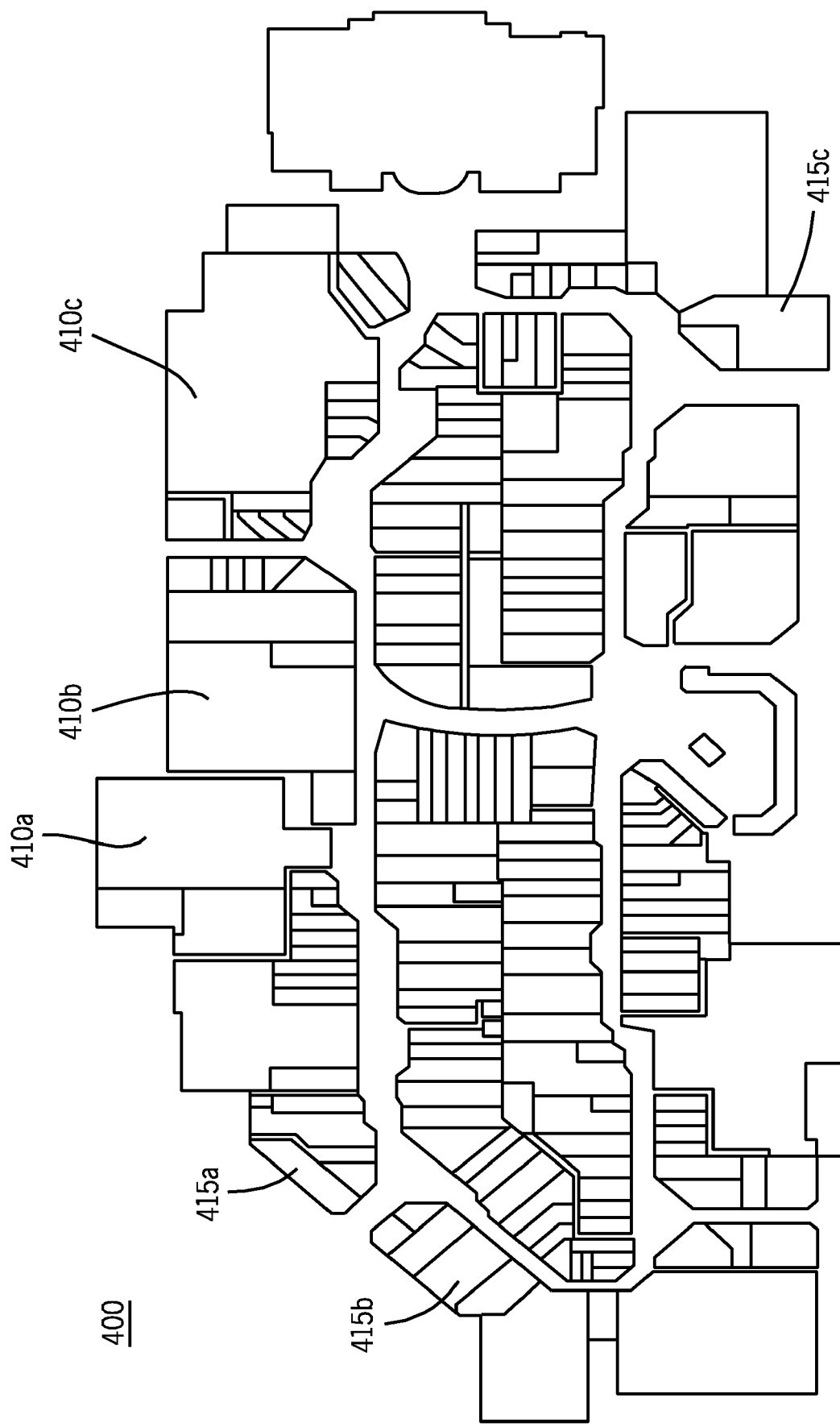
FIG. 4 is a graphical representation of a shopping mall floor plan for which positioning and navigation in accordance with various embodiments can be utilized.
Figure 5:
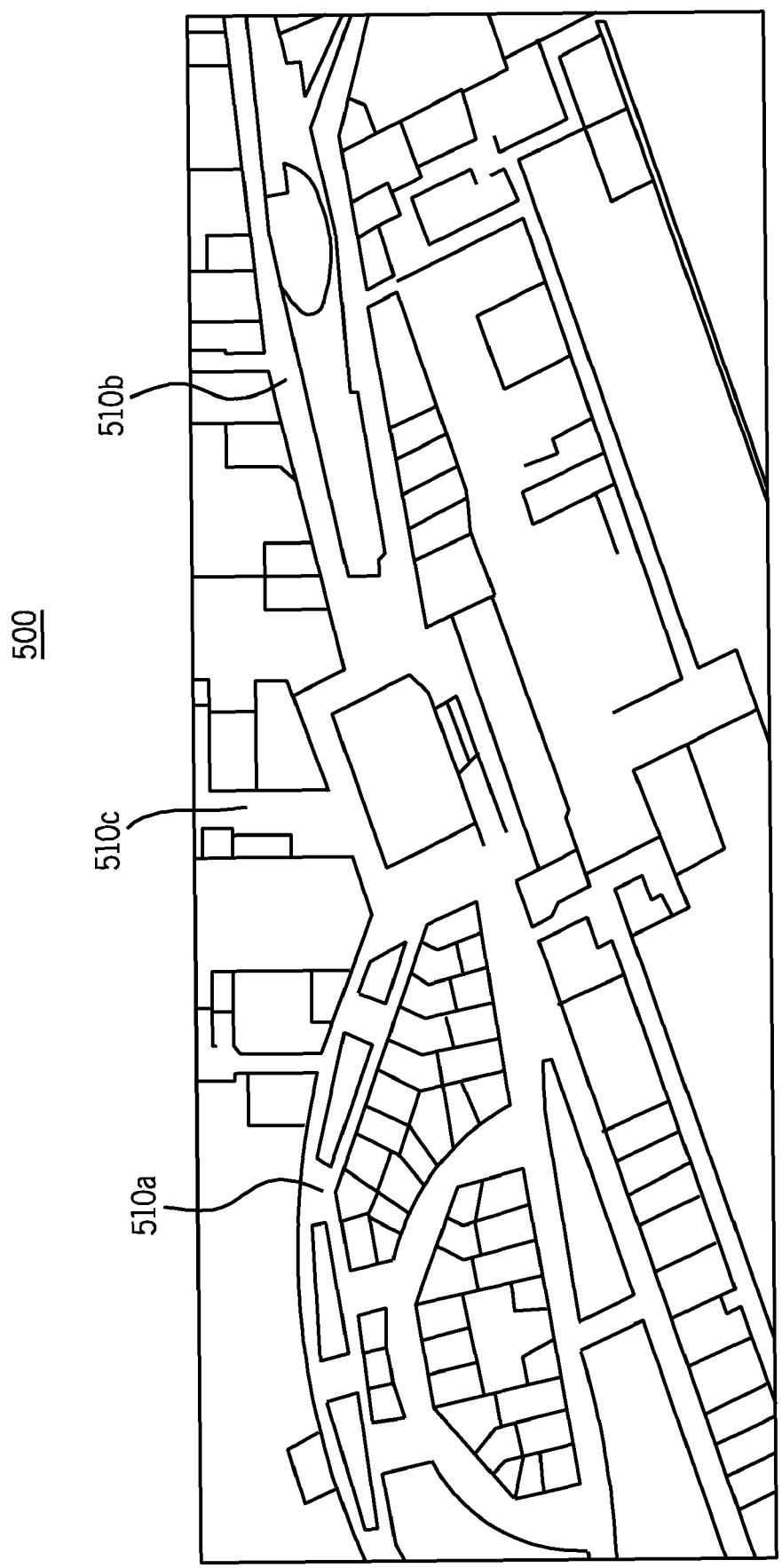
FIG. 5 is graphical representation of a shopping mall street plan for which positioning and navigation in accordance with various embodiments can be utilized.

FIG. 4 is one example of a larger shopping mall 400, where positioning inside the building and navigation would be useful. The floor plan of the mall above shows the name of certain of the shops, e.g., 410a, 410b, 410c, etc., while for smaller shops a number is displayed, e.g., 415a, 415b, 415c, etc. However, this is only for display convenience as all store numbers need to be linked to the actual store name in the directory of the mall in order to enable locating a store by its name and making it possible to provide directions to the store. FIG. 5 is another example of a shopping mall 500 with its own streets, e.g., 510a, 510b, etc. Again, it should be noted that these "mall streets" only have local significance to the mall. In the particular case illustrated in FIG. 5, one of the street names 515c found inside the mall is also the name of the street associated with the main entrance to the mall is (which is the civic address of the mall).

Current civic address formats do include, e.g., street address, number, floor number, room number, seat number, etc., but this information cannot always be "reused" for positioning and/or navigation purposes inside structures as the internal structure and addressing of a building may conflict with the external one. Moreover, in most cases it is not accurate enough. Hence, a hierarchical description or indoor addressing is needed or, at least, current civic address types should be extended with locally significant fields relative to the civic address of the building.

Geolocation on the other hand is often times not available inside a building because GPS signals from satellites generally cannot be received within structures such as buildings, and thus do not provide assistance in determining a WLAN AP location. Even if an operator of a WLAN AP is willing to manually configure the geo-coordinates of a WLAN AP located inside a building, there are no automatic mechanisms for determining what those geo-coordinates would be.

Even considering that by using, e.g., an advanced GPS device, altitude information associated with a WLAN AP location can be determined, due to the nature of GPS signals, altitude accuracy is likely at only half of the accuracy which can be achieved for longitude and latitude coordinates. That is, the best accuracy that can be achieved for altitude utilizing geolocation is on the order of ~10 m, which in certain instances would cover 3 floors in some buildings. T geolocation format is not suitable for positioning and navigation inside large buildings, except for some cases where a building's structure may, for example, be only one floor. In this case, manual configuration would be required.

Given the aforementioned issues, extensions to existing positioning and/or navigation standards are provided in accordance with various embodiments so as to allow for the use of WLAN location in an automatic way for positioning and/or navigation inside buildings.

In accordance with various embodiments, extensions are provided for use with regard to certain standards. For example, the IEEE 802.11u standard WG defines a mechanism which allows WLAN devices to retrieve some data from a WLAN AP before association. In accordance with various embodiments, it is specified in the IEEE 802.11u standard that one type/piece of information to be retrieved without association, is the location of the WLAN AP. Therefore, such information is freely available for all WLAN devices (not only to authorized users), without requiring them to associate with the WLAN AP. It should be noted that bypassing the need for association can provide time savings as conventional association with a WLAN AP by itself can be time consuming, even if the WLAN AP provides free access. Moreover, freely providing the location of a WLAN AP is not harmful as anyone can with a WLAN device may freely perform scanning to determine available access points, read an associated MAC address, and save the location where the signal was seen/scanned.

Furthermore, the Internet Engineering Task Force (IETF) GEOPRIV civic location data format can also be extended to include civic address types which have local significance (e.g., wing, sector, tower, exhibition hall number, store name, store number, street name, street address, building facilities, internal floor number, airport name, terminal number, gate number, etc.) The location of a WLAN AP can either be natively configured into the management information base (MIB) of the WLAN AP, or a separate database can be configured to list the MAC address of the WLAN AP and its location inside the building.

In accordance with various embodiments, a mapping application (or other application/service with mapping/positioning functionality) may also be extended by creating and loading the floor plan of various buildings of interest (e.g., airports, public buildings, offices) into the mapping application. This can be accomplished using scalable vector graphics (SVG) for example. Thus, when a user places a cursor/pointer over a representation of a building on a display of the mapping application, the building representation being displayed switches to an "indoor view" to display the floor plan of that building to the user. If multiple floors exists in the building's floor plan, one floor plan representative of, e.g., the ground floor, may be displayed by default. Moreover, floor plans of additional floors of the building may be displayed upon the user choosing an option to display the floor plan of an additional floor.

It should be noted that extending the mapping application to include such floor plans for public buildings can be accomplished with relative ease because public building floor plans are generally available online and may be linked to a database utilized by the mapping application. Thus, a user, for example, may download a picture of a desired public building floor plan (e.g., a jpg file of the floor plan) to the mapping application. Alternatively, the floor plan may already be linked to a digital map, and thus a user may navigate and the mapping application displays the floor plan when the user/cursor is near or in the building). The mapping application may then display that floor plan picture to the user when the user places a cursor/pointer on the building, without positioning and navigation capabilities. A floor plan which enables positioning and navigation would utilize a floor plan in a map format using, e.g., an Extensible Markup Language (XML)-based map such as one utilizing SVG), although other formats are contemplated herein. Additionally, locations inside of a building are tagged and associated with either indoor civic locations or calculated coordinates (either relative to the building or WGS).

It should further be noted that various embodiments may be utilized with GPS-capable devices. That is, when a user with a GPS capable device comes within close proximity of a building, the mapping application described above (operating on the user's electronic/mobile device), automatically displays an "indoor view" option for that building to the user. The user may then switch to the indoor view and view the floor plan of the building, if the user chooses to, by selecting the indoor view option. How close a user is to a building or structure before the indoor view option is presented to the user may be configured within the electronic device at some prior time or may be configured by the user.

Figure 6:
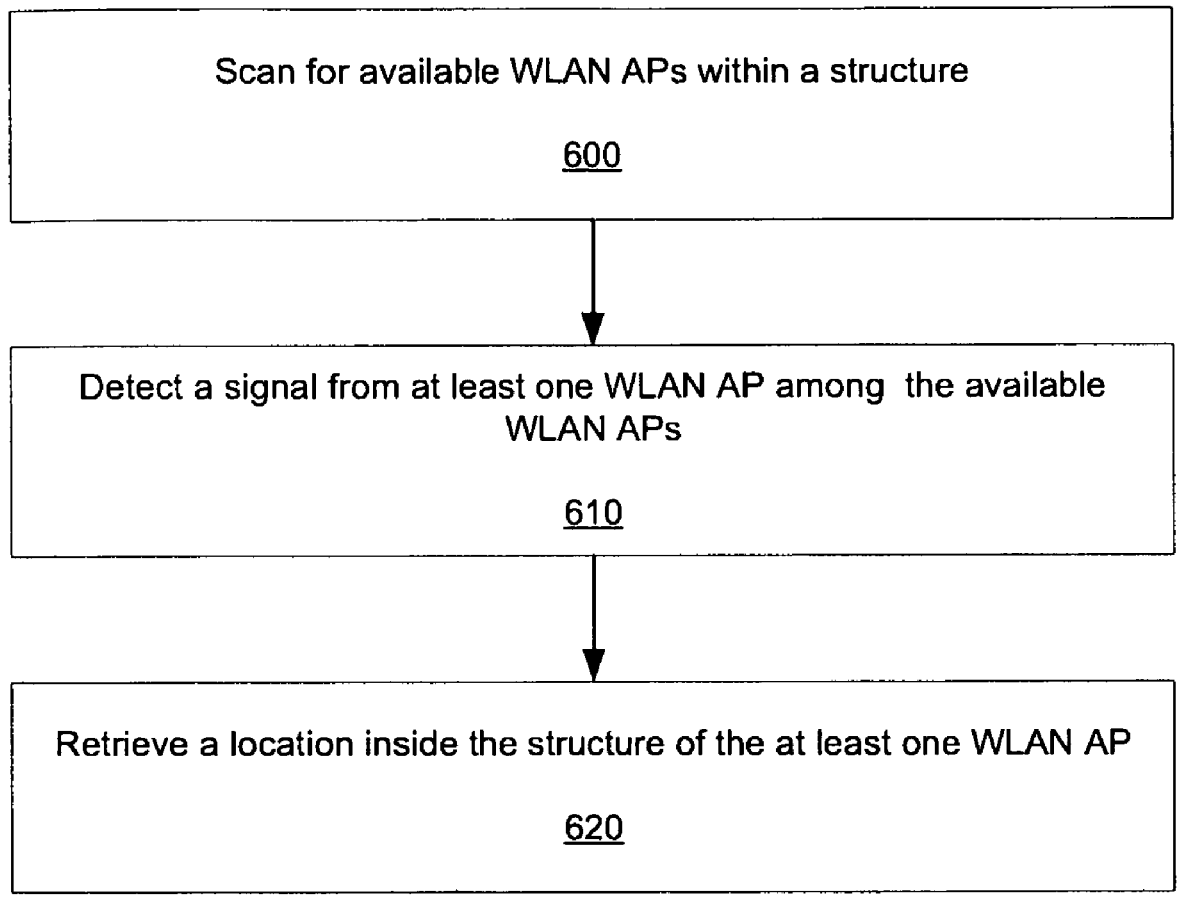
FIG. 6 is a flow chart illustrating processes performed to achieve positioning and/or navigation in accordance with various embodiments.

Once a user enters a building or structure, various processes are performed to effectuate positioning and navigation. FIG. 6 is a flow chart illustrating various processes in accordance with various embodiments. An electronic/mobile device of the user scans for available WLAN APs within a structure at 600 upon entering or coming within close proximity to a building or the structure. At 610, if available WLAN APs exist, the electronic/mobile device detects a signal from the at least one of the available WLAN APs. At 620, the electronic/mobile device retrieves the location inside the building or structure of the at least one of the available WLAN APs.

In accordance with one embodiment, once the electronic/mobile device detects a signal from the at least one WLAN AP, the electronic/mobile device downloads the location of the WLAN AP. Downloading of the WLAN AP location is made possible by the extensions described above to the IEEE 802.11u standard and/or the WLAN AP is "open access." In this embodiment, a new info ID definition is added to the existing Native Query protocol info ID definitions table, which would permit downloading the APs location even while in state-1.

TABLE 1

Native Query protocol info ID definitions

| Info Name | Info ID | Native Info Element (clause) |
|---|---|---|
| Capability List Information | 1 | 7.3.3.1 |
| Venue Name Information | 3 | 7.3.3.2 |
| Emergency Call Number Information | 4 | 7.3.3.3 |
| Emergency Public Network Access Information | 5 | 7.3.3.4 |
| Network Authentication Type Information | 6 | 7.3.3.5 |
| Roaming Consortium List | 7 | 7.3.3.6 |
| Reserved | 8-220 | n/a |
| Vendor Specific Information | 221 | n/a |
| Reserved | 222-255 | n/a |
| AP Location Information | 8 | 7.3.3.7 |

The Native Query Protocol is a mechanism specified in the IEEE 802.11u standard that allows a non-AP STA (electronic/mobile device) to query an AP for locally configured data. Hence the AP can directly respond to queries without proxying the query to a server or external network, and the querying device need not associate with the WLAN AP. It should be noted that that other query protocols may be utilized to achieve various embodiments. In accordance with one embodiment and as described above, WLAN AP location information may be queried and downloaded. Using the WLAN AP location information downloaded from the WLAN AP, a position of the electronic/mobile device can be determined inside the building. Moreover, the mapping application described above may also be configured to display the name of the building the user is in.

If the extension to the IEEE 802.11u standard described above is not supported, (e.g., the user is denied access to the WLAN AP while in state-1 or the WLAN AP does not have its location configured), positioning and navigation inside the building is still possible via indirect methods such as using an external database. It should be noted that state-1 refers to an unauthenticated state.

Extensions to the IETF GEOPRIV civic location data format may be implemented. That is, additional civic address (CA) type (CAtype) elements are added to the Presence Information Data Format Location Object (PIDF-LO) format and/or Location Configuration Information (LCI) (RFC3825&RFC4776) that can more precisely refer to/label position reference points. Thus, when determining positioning through use of the IEFT GEOPRIV civic location data, more precise positioning can be accomplished. The PIDF-LO and LCI formats conventionally support CAtype elements such as CAtype 28 indicative of room, CAtype 33 indicate of seat, etc. Table 2 below lists additional CAtype elements in accordance with one embodiment. It should be noted that more (e.g., reference points such as waterfalls, statues, etc. located within a building) or fewer CAtype elements may be added to the PIDF-LO and/or LCI formats in accordance with various embodiments.

TABLE 2

Exemplary list of additional/extension CAtype elements to PIDF-LO and/or LCI formats

| New Civic Field | CAtype | Description | Example |
|---|---|---|---|
| Building section | 401 | Section of a building | Sector-4 |
| Building wing | 402 | Wing of a building | Conf. wing |
| Building tower | 403 | Tower of a building (e.g., in resort) | Tapa tower |
| Internal street | 404 | Internal street name | $19^{th}$ Ave. |
| Internal street number | 405 | Internal street number | 255 |
| Store name | 410 | Name of store | Gucci |
| Store number | 411 | Store number | 463 |
| Exhibition hall | 406 | Exhibition hall name/number | 22-4 |
| Building facilities | 408 | Building facility | Cafeteria |
| Internal floor number | 407 | Internal floor number | 2 |
| Airport name | 420 | Name of airport | O'Hare |
| Terminal number | 421 | Terminal number | 5 |
| Gate number | 422 | Terminal gate number | 8 |

It should be noted that the extensions to the IETF GEOPRIV civic address format do not necessarily need to be standardized for positioning inside the building to work. That is, if all of the requisite location data is always stored in a database associated with the mapping application or within the mapping application described above (as opposed to in the actual WLAN APs), positioning would still be possible through the use of the mapping application. In this case, the CAtype elements would then be specific to a particular service or application, e.g., the mapping application.

In accordance with another embodiment, upon scanning for available APs and detecting a WLAN AP signal (e.g., a beacon of a WLAN AP), the electronic/mobile device reads the MAC address of the WLAN AP from the beacon. Subsequently, the location of the WLAN AP is retrieved from a database, using the MAC address to identify the correct location information associated beforehand with the particular WLAN AP in the database. That is, the MAC address is utilized as, e.g., a pointer, to the location information associated with the WLAN AP that is stored in the database, where the location comprises the IETF GEOPRIV CAtype extension elements described above. The building's management may provide a database of the installed WLAN APs in that building along with their location relative to the floor plan. This data can be uploaded into a mapping application as described above. If such a database is not available, a database can be constructed by simply walking through the building with a WLAN device and recording the MAC addresses in the beacons found while scanning, together with the civic location fields/CAtype extension elements described above relative to the floor plan. Again, this data can then be uploaded to a database accessible to the mapping application.

Additionally, the mapping application can provide an Application Programming Interface (API) for users to populate such a database by specifying the location of the WLAN AP inside the building using CAtype extension elements described above. For example, when a user finds a WLAN AP with a MAC address not yet in the database, the user could request that the WLAN AP be added to the database. After the request is verified and found legitimate, the user may get an incentive for his/her contribution. Alternatively still, different locations within a building may be identified by geocoordinates instead of civic addresses. For example, a building corner may have coordinates (a,b), where the position of reference points/places inside the building can be calculated relative to that corner. The coordinates of the corner can be "true" geolocation (latitude, altitude) coordinates, but it could well be (0,0) and the position of the rest of the places could be calculated, e.g., in a Cartesian coordinate system. However, labels/names for the reference points/places inside the building need to be identified (e.g., store 123 has coordinates (c,d), or gate 86 in terminal 3 has coordinates (e,f)) which can be assigned coordinates.

Various embodiments described above can determine the location of an electronic/mobile device by determining a location of a WLAN AP. That is, for positioning and/or navigation purposes, the location of the electronic/mobile device can be assumed to be that of the WLAN AP when it is in sufficient proximity to the WLAN AP to, e.g., detect a signal from the WLAN AP. However, if more than one WLAN AP signal is detected, triangulation or simple geometric "shaping" can be used by the device to calculate a more precise position/location. The accuracy of a determined position/location can also be calculated and displayed on a display of the floor plan with the mapping application, e.g. in the form of shadow around the calculated position.

Navigation can be provided by connecting or relating a determined or calculated position/location of an electronic/mobile device with a desired destination. The desired destination may be specified by a user of the electronic/mobile device by, e.g., scrolling through a display of a particular floor plan, and pointing a cursor at/indicating a location inside the building. Alternatively, the user may specify a civic address with local significance (e.g., building wing, tower, store number, store name, hall, building facility, airport name, terminal or gate number, internal street name and number, etc.) Furthermore, the reference point/location may be labeled, tagged and/or linked to a building directory to provide navigation capability.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   scanning for available wireless local area network access points within a structure;
   detecting a signal from at least one available wireless local area network access point among the available wireless local area network access points; and
   retrieving location information of the at least one available wireless local area network access point, by querying the at least one available wireless local area network access point for locally configured data while in an unauthenticated state, via a query protocol, wherein the locally configured data comprises an 802.11u native query protocol AP location information definition extension indicative of the location information,
   wherein the scanning, the detecting, and the retrieving are performed by a mobile user device without associating with the at least one available wireless local area network access point.

2. The method of claim 1, wherein the retrieving comprises downloading the location information directly from the at least one available wireless local area network access point.

3. The method of claim 2, wherein the downloading of the location information comprises retrieving one of a Presence Information Data Format Location Object GEOPRIV civic address type and a Location Configuration Information extension element indicative of the location information.

4. The method of claim 3, wherein the Location Configuration Information extension element is specified for the structure and absent from the GEOPRIV civic address type.

5. The method of claim 4, wherein the a Location Configuration Information extension element includes a wing, sector, tower, exhibition hall number, store name, store number, internal floor number, airport name, terminal number, gate number, or a combination thereof.

6. The method of claim 1 further comprising, performing the scanning, the detecting, and the retrieving automatically via an electronic device when a user of the electronic device at least one of enters and is within substantially close proximity to the structure.

7. The method of claim 6 further comprising, performing the scanning, the detecting, and the retrieving via a mapping application resident on the electronic device.

8. The method of claim 7 further comprising, presenting to the user at least one of a floor plan of the structure and the location information relative to the floor plan of the structure via an automatic indoor view option of the mapping application, wherein the floor plan of the structure comprises one of a representative picture and an extensible language-based map.

9. The method of claim 8 further comprising, presenting an option to switch a display of the at least one of the floor plan of the structure to one of a plurality of floors associated with the at least one of the floor plan of the structure.

10. The method of claim 8 further comprising, presenting the automatic indoor view option upon the user coming to sufficient proximity to the structure, wherein the electronic device has global positioning capabilities outside of the structure.

11. The method of claim 1, wherein the retrieving comprises reading a Media Access Control address of the at least one available wireless local area network access point and accessing a database, wherein the location information of the at least one available wireless local area network access point is stored, and wherein the Media Access Control address is associated with the location information of the at least one available wireless local area network access point.

12. The method of claim 11, wherein the database is accessible to a mapping application resident on an electronic device configured to perform the scanning, the detecting, and the retrieving.

13. The method of claim 1, further comprising performing at least one of triangulation and simple geometric shaping to calculate the location information when a plurality of available wireless local area network access points exist.

14. The method of claim 1, further comprising providing navigation capability to a user of an electronic device configured to perform the scanning, the detecting, and the retrieving by relating the location information to a desired destination.

15. The method of claim 1, wherein the location information refers to a reference point within the structure, and wherein the reference point is tagged and linked to a directory of the structure to provide navigation capability.

16. An apparatus, comprising:
at least one processor; and
at least one memory including computer program code for one or more programs,
the at least one memory and the computer program code configured to, with the at least one processor, cause the apparatus to perform at least the following,
scan for available wireless local area network access points within a structure;
detect a signal from at least one available wireless local area network access point among the available wireless local area network access points; and
retrieve location information of the at least one available wireless local area network access point, by querying the at least one available wireless local area network access point for locally configured data while in an unauthenticated state, via a query protocol, wherein the locally configured data comprises an 802.11u native query protocol AP location information definition extension indicative of the location information, wherein the apparatus is included in a mobile user device that does not associate with the at least one available wireless local area network access point during the scanning, the detecting, and the retrieving.

17. The apparatus of claim 16, wherein the apparatus is further caused to: retrieve the location information is further configured to download the location information directly from the at least one available wireless local area network access point.

18. The apparatus of claim 17, wherein the apparatus is further caused to: download the location information is further configured to retrieve one of a Presence Information Data Format Location Object GEOPRIV civic address type and a Location Configuration Information extension element indicative of the location information.

19. The apparatus of claim 16, wherein the apparatus is further caused to: perform the scanning, the detecting, and the retrieving automatically when a user of the apparatus at least one of enters and is within substantially close proximity to the structure.

20. The apparatus of claim 19, wherein a mapping application resident on the apparatus at least one of performs the scanning, the detecting, and the retrieving and downloads the location information.

21. The apparatus of claim 20, wherein an automatic indoor view option of the mapping application is configured to present to the user at least one of a floor plan of the structure and the location information relative to the floor plan of the structure, wherein the floor plan of the structure comprises one of a representative picture and an extensible language-based map.

22. The apparatus of claim 21, wherein the mapping application is further configured to present an option to switch a display of the at least one of the floor plan of the structure to one of a plurality of floors associated with the at least one of the floor plan of the structure.

23. The method of claim 21, wherein the mapping application is further configured to present the automatic indoor view option upon the user coming to sufficient proximity to the structure, wherein the apparatus has global positioning capabilities outside of the structure.

24. The apparatus of claim 16, wherein the apparatus is further caused to: retrieve is further configured to read a Media Access Control address of the at least one available wireless local area network access point and access a database, wherein the location information of the at least one available wireless local area network access point is stored, and wherein the Media Access Control address is associated with the location information of the at least one available wireless local area network access point.

25. The apparatus of claim 24, wherein the database is accessible to a mapping application resident on an electronic device configured to perform the scanning, the detecting, and the retrieving.

26. The apparatus of claim 16, wherein the apparatus is further caused to: at least one of triangulate and perform simple geometric shaping to calculate the location information when a plurality of available wireless local area network access points exist.

27. The apparatus of claim 16, wherein the apparatus is further caused to: provide navigation capability to a user of the apparatus by relating the location information to a desired destination.

28. The apparatus of claim 16, wherein the location information refers to a reference point within the structure, and wherein the reference point is tagged and linked to a directory of the structure to provide navigation capability.

29. The apparatus of claim 16, wherein the scanning, the detecting, and the retrieving processes are implemented by computer code embodied on a non-transitory computer-readable storage medium.

30. The apparatus of claim 16, wherein the scanning, the detecting, and the retrieving processes are implemented by a chipset of the mobile user device.

31. A non-transitory computer-readable storage medium carrying one or more sequences of one or more instructions which, when executed by one or more processors, cause an apparatus to at least perform the following steps:

scanning for available wireless local area network access points within a structure;

detecting a signal from at least one available wireless local area network access point among the available wireless local area network access points; and retrieving location information of the at least one available wireless local area network access point, by querying the at least one available wireless local area network access point for locally configured data while in an unauthenticated state, via a query protocol, wherein the locally configured data comprises an 802.11u native query protocol AP location information definition extension indicative of the location information, wherein the scanning, the detecting, and the retrieving are performed by a mobile user device without associating with the at least one available wireless local area network access point.

32. The computer-readable storage medium of claim 31, wherein the retrieving comprises downloading the location information directly from the at least one available wireless local area network access point.

33. The computer-readable storage medium of claim 32, wherein the downloading of the location information comprises retrieving one of a Presence Information Data Format Location Object GEOPRIV civic address type and a Location Configuration Information extension element indicative of the location information.

\* \* \* \* \*